United States Patent
Kim et al.

(10) Patent No.: US 11,108,516 B2
(45) Date of Patent: Aug. 31, 2021

(54) METHOD FOR ALLOCATING REFERENCE SIGNAL RESOURCE IN WIRELESS COMMUNICATION SYSTEM AND APPARATUS THEREFOR

(71) Applicant: LG Electronics Inc., Seoul (KR)

(72) Inventors: Youngtae Kim, Seoul (KR); Hanbyul Seo, Seoul (KR); Hyukjin Chae, Seoul (KR); Heejin Kim, Seoul (KR); Seungmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 50 days.

(21) Appl. No.: 16/492,250

(22) PCT Filed: Mar. 21, 2018

(86) PCT No.: PCT/KR2018/003265
§ 371 (c)(1),
(2) Date: Sep. 9, 2019

(87) PCT Pub. No.: WO2018/174543
PCT Pub. Date: Sep. 27, 2018

(65) Prior Publication Data
US 2020/0162213 A1 May 21, 2020

Related U.S. Application Data

(60) Provisional application No. 62/474,582, filed on Mar. 21, 2017.

(51) Int. Cl.
*H04L 5/00* (2006.01)
*H04W 4/44* (2018.01)
(Continued)

(52) U.S. Cl.
CPC .......... *H04L 5/0048* (2013.01); *H04L 1/0057* (2013.01); *H04L 1/0618* (2013.01);
(Continued)

(58) Field of Classification Search
None
See application file for complete search history.

(56) References Cited

U.S. PATENT DOCUMENTS

2010/0208716 A1* 8/2010 Mujtaba .............. H04L 1/0606
370/342
2011/0170631 A1* 7/2011 Kim .................... H04L 5/0023
375/296
(Continued)

FOREIGN PATENT DOCUMENTS

CN 102379091 A 3/2012
CN 104704755 A 6/2015
(Continued)

OTHER PUBLICATIONS

R1-1702331:3GPP TSG RAN WG1 Meeting # 88, Athens, Greece, Feb. 13-17, 2017, InterDigital Communications, "On UL DM-RS design for NR," pp. 1-3.
(Continued)

*Primary Examiner* — Rebecca E Song
(74) *Attorney, Agent, or Firm* — Dentons US LLP

(57) ABSTRACT

The present invention relates to a method and apparatus for a transmission device to transmit a reference signal in a wireless communication system. Specifically, the method includes: a step for receiving the settings of a resource pool composed of uplink resources; and a step for mapping reference signals and data onto a specific uplink resource on the basis of the resource pool settings and N (where N is a natural number) antennas for the transmission device, and is characterized in that the reference signals are mapped to at least one resource element at a specific location on the specific uplink resource, and the data is mapped on the specific uplink resource excluding the at least one specific location to be mutually orthogonal on the basis of one resource axis among the time-frequency resources and so
(Continued)

that the data is continuous depending on the number of antennas. The transmitting device is capable of communicating with at least one of another receiving device, a receiving device related to an autonomous driving vehicle, a base station or a network.

9 Claims, 14 Drawing Sheets

(51) Int. Cl.
    *H04L 1/00*     (2006.01)
    *H04L 1/06*     (2006.01)
    *H04L 1/18*     (2006.01)
    *H04W 72/04*     (2009.01)

(52) U.S. Cl.
    CPC .......... *H04L 1/1861* (2013.01); *H04L 5/0007* (2013.01); *H04W 4/44* (2018.02); *H04W 72/0413* (2013.01)

(56) References Cited

U.S. PATENT DOCUMENTS

2017/0026100 A1* 1/2017 Wang ................. H04L 27/2666
2017/0230972 A1* 8/2017 Wang ................. H04L 5/0048
2018/0007726 A1* 1/2018 Li ....................... H04W 76/10
2018/0035406 A1* 2/2018 Hao .................... H04L 5/0046

FOREIGN PATENT DOCUMENTS

| CN | 105162510 A | 12/2015 |
| WO | 2013183975 A1 | 12/2013 |
| WO | 2016004634 A1 | 1/2016 |
| WO | 2016133363 A1 | 8/2016 |
| WO | 2016163738 A1 | 10/2016 |
| WO | 2017018703 A1 | 2/2017 |

OTHER PUBLICATIONS

R1-1611604:3GPP TSG-RAN WG1 #87, Nov. 14-18, 2016, Reno, USA, Qualcomm Incorporated, "Remaining details on uplink DMRS for FD-MIMO," pp. 1-5.

R1-1701696:3GPP TSG RAN WG1 Meeting # 88, Athens, Greece, Feb. 13-17, 2017, Huawei, HiSilicon, "UL DMRS design for data transmission," pp. 1-9.

* cited by examiner

FIG. 2
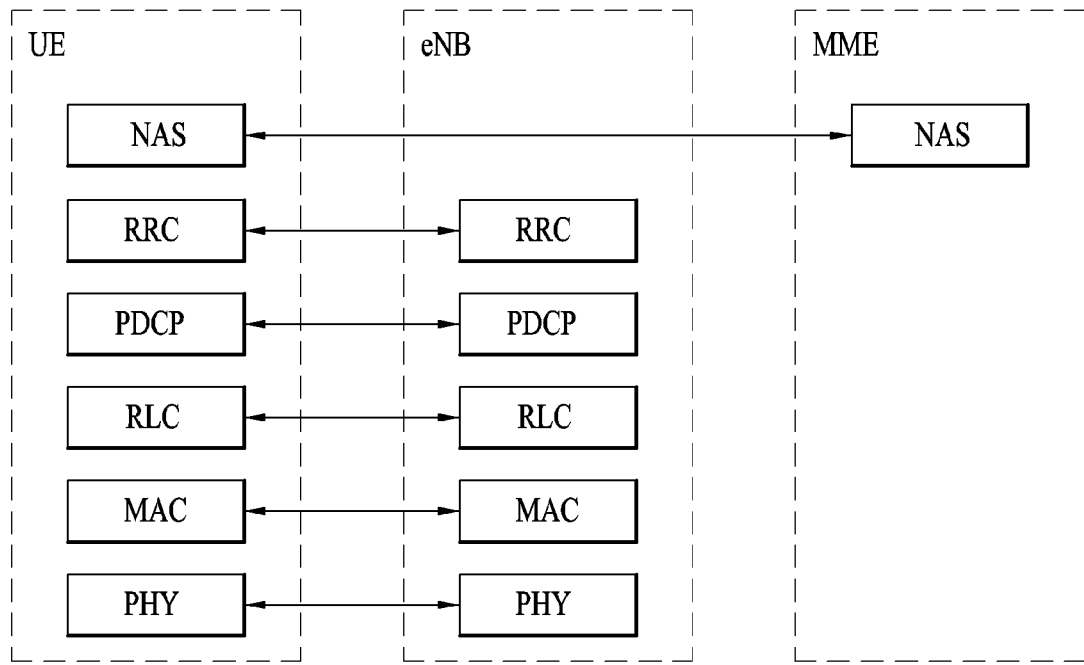
(a) Control-plane protocol stack
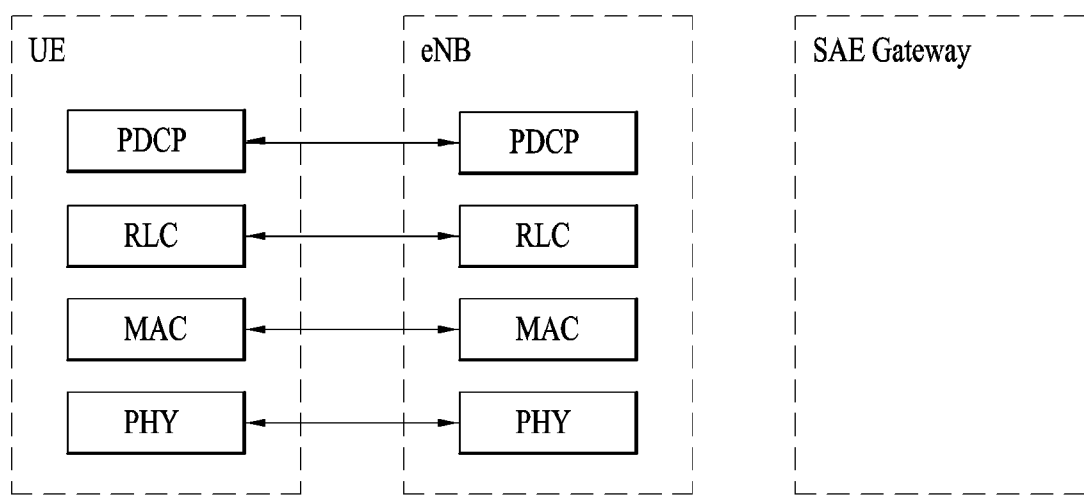
(b) User-plane protocol stack FIG. 8
(a)
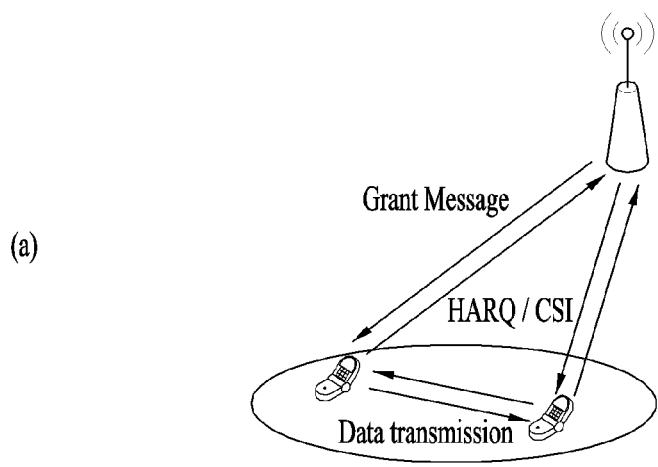
(b)
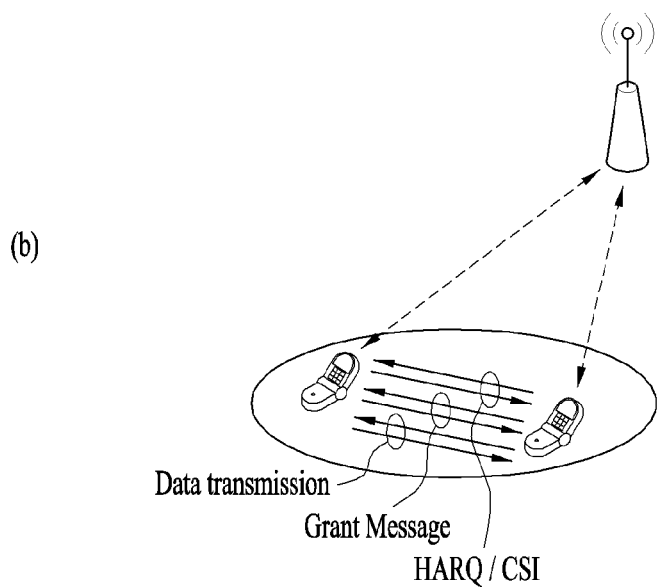

METHOD FOR ALLOCATING REFERENCE SIGNAL RESOURCE IN WIRELESS COMMUNICATION SYSTEM AND APPARATUS THEREFOR

This application is a National Stage Entry of International Application No. PCT/KR2018/003265 filed Mar. 21, 2018, which claims the benefit of U.S. Provisional Application No. 62/474,582 filed Mar. 21, 2017, all of which are hereby incorporated by reference in their entirety for all purposes as if fully set forth herein.

TECHNICAL FIELD

The present disclosure relates to a wireless communication system, and more particularly, to a method of allocating a reference signal resource and apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE

Technical Problem

Based on the above discussion, the present disclosure proposes a method of allocating a reference signal resource in a wireless communication system and apparatus therefor.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

In an aspect of the present disclosure, provided herein is a method of transmitting a reference signal by a transmitting device in a wireless communication system. The method may include receiving a configuration of a resource pool consisting of uplink resources and mapping reference signals and data to a specific uplink resource based on the resource pool configuration and N antennas of the transmitting device (where N is a natural number). The reference signals may be mapped to resource elements positioned at one or more specific locations in the specific uplink resource, and the data may be mapped to the specific uplink resource except the one or more specific locations such that the data are orthogonal to each other either in the time domain or in the frequency domain and consecutive as many as the number of antennas.

The reference signals and data may be mapped to at least one resource set, each of which is composed of N+1 resource elements. A distance between the reference signals mapped to the at least one resource set may correspond to the N+1 resource elements.

N may be 4, and the reference signals may be configured to be mapped to the at least one resource set and resource elements not included in the at least one resource set in the specific uplink resource.

The at least one resource set may include a first resource set and a second resource set, and the first and second resource sets may be configured to use different antenna ports.

Only when the movement speed of the transmitting device is equal to or smaller than a predetermined value, the data may be mapped such that the data are orthogonal to each other.

The data may be configured to be orthogonal to each other on uplink resources except the one or more specific locations by applying a space-time block code (STBC) in the time domain.

The data may be configured to be orthogonal to each other on uplink resources except the one or more specific locations by applying a space-frequency block code (SFBC) in the frequency domain.

The reference signals may be mapped in an N-comb manner either in the time domain or in the frequency domain.

The uplink resource may correspond to an uplink subframe.

In another aspect of the present disclosure, provided herein is a transmitting device for transmitting a reference signal in a wireless communication system. The transmitting device may include a radio frequency unit and a processor. The processor may be configured to receive a configuration of a resource pool consisting of uplink resources and map reference signals and data to a specific uplink resource based on the resource pool configuration and N antennas of the transmitting device (where N is a natural number). The reference signals may be mapped to resource elements positioned at one or more specific locations in the specific uplink resource, and the data may be mapped to the specific uplink resource except the one or more specific locations such that the data are orthogonal to each other either in the time domain or in the frequency domain and consecutive as many as the number of the antennas.

Advantageous Effects

According to the present disclosure, reference signal resource allocation can be efficiently performed in a wireless communication system.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 illustrates control plane and user plane structures of a radio interface protocol between a UE and an E-UTRAN on the basis of the 3GPP wireless access network standard.

FIG. 8 is a reference diagram to describe D2D (UE-to-UE) communication.

BEST MODE

Figure 1:
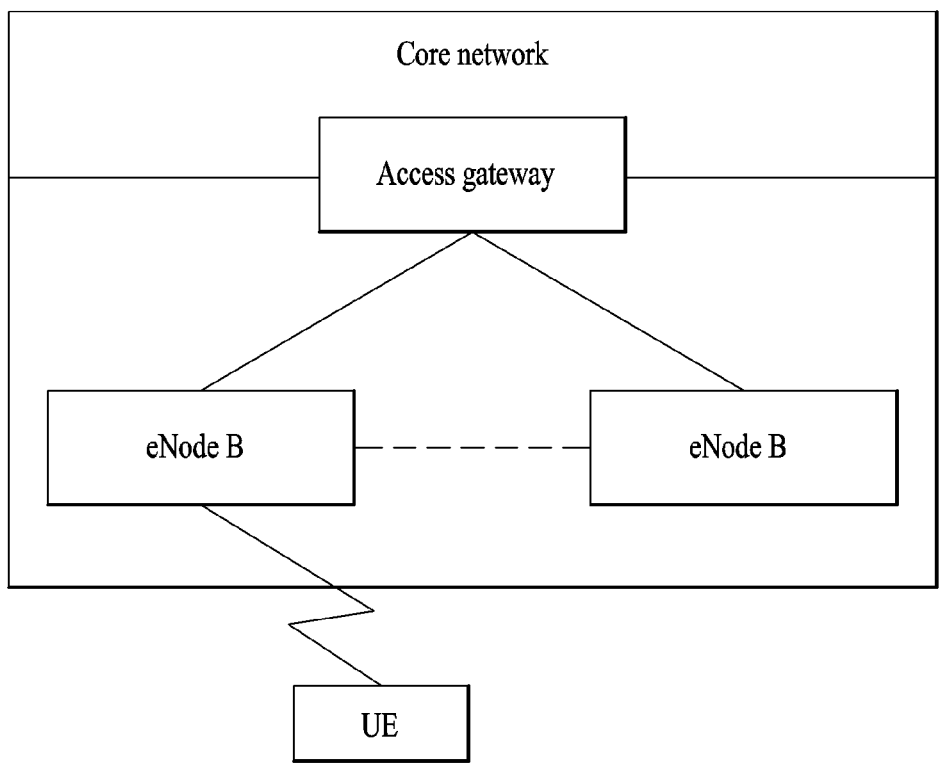
FIG. 1 schematically illustrates an E-UMTS network structure as an example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
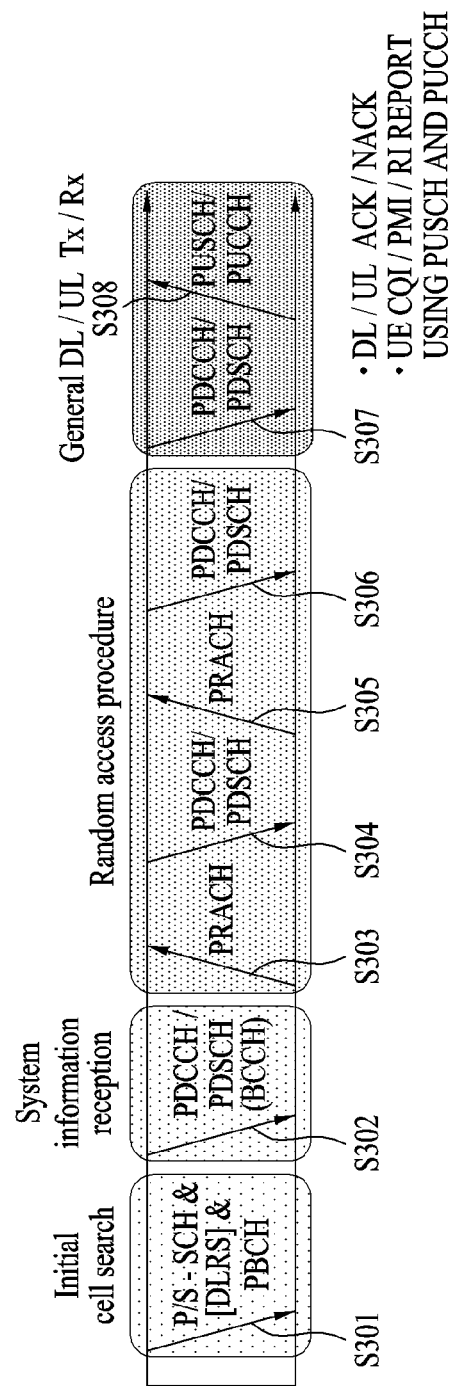
FIG. 3 illustrates physical channels used in a 3GPP system and a general signal transmission method using the same.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303) and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
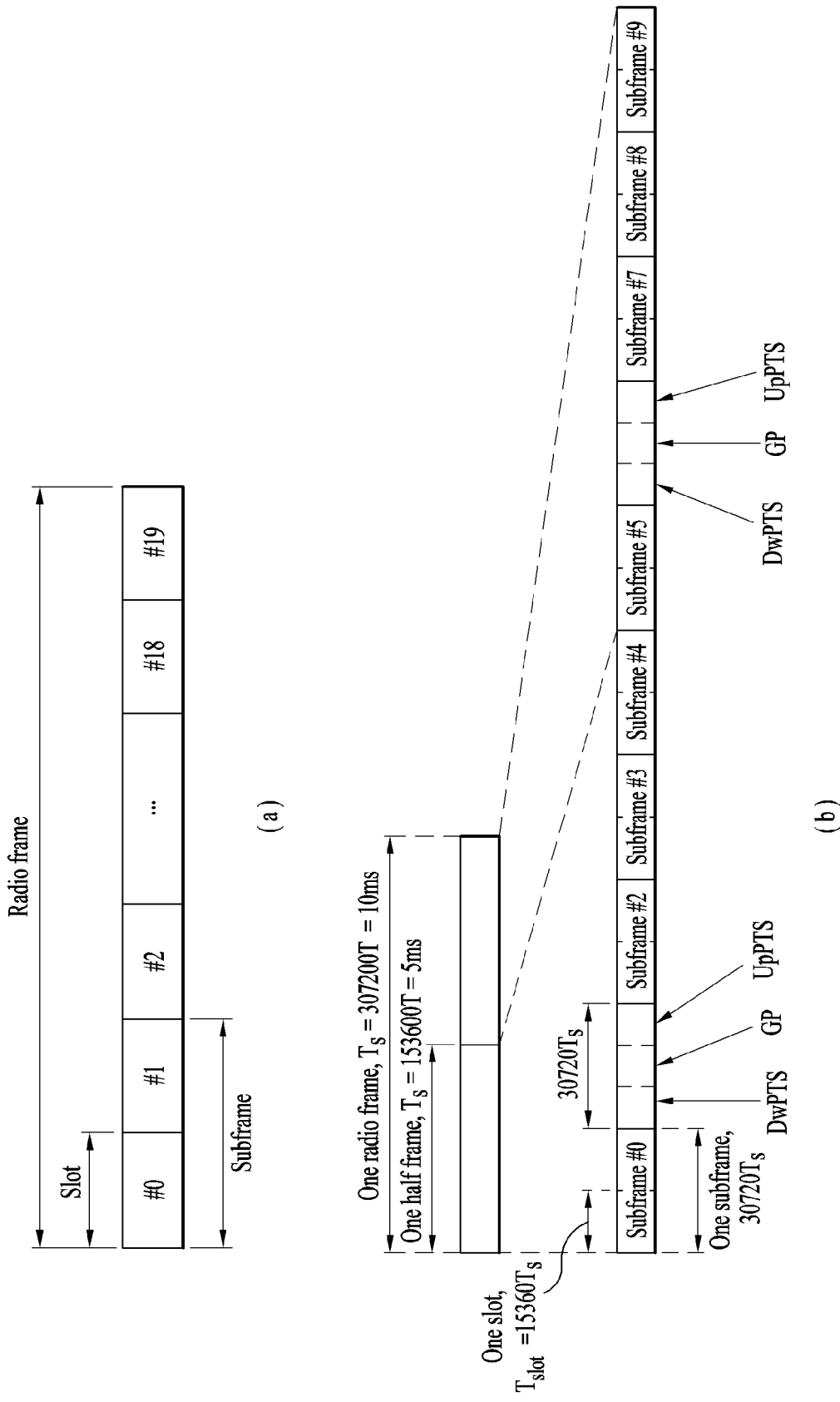
FIG. 4 illustrates a radio frame structure used in LTE.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000\times2048)$, and the other region is configured for the guard period.

TABLE 1

| Special subframe configuration | Normal cyclic prefix in downlink | | | Extended cyclic prefix in downlink | | |
|---|---|---|---|---|---|---|
| | | UsPTS | | | UsPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
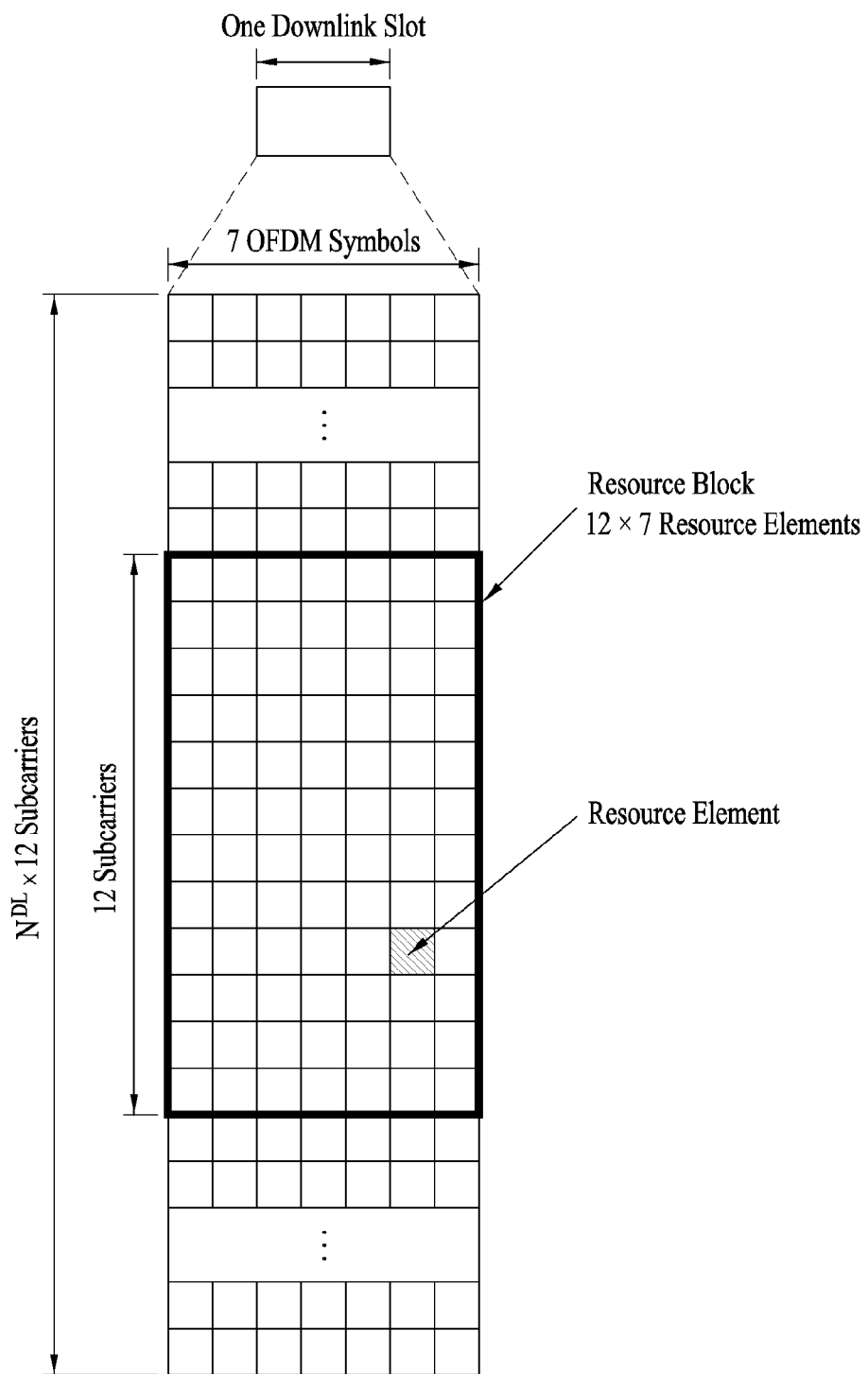
FIG. 5 illustrates a resource grid for a downlink slot.

FIG. 5 illustrates a resource grid for a downlink slot.

Referring to FIG. 5, a DL slot includes $N\_symb^{DL}$ OFDM symbols in a time domain and $N\_RB^{DL}$ resource blocks in a frequency domain. Since each of the resource blocks includes $N\_SC^{RB}$ subcarriers, the DL slot includes $N\_RB^{DL} \times N\_SC^{RB}$ subcarriers in the frequency domain. Although FIG. 5 shows an example in which the DL slot includes 7 OFDM symbols and the resource block includes 12 subcarriers, the present invention is not limited thereto. For instance, the number of OFDM symbols included in the DL slot can vary depending to a length of a cyclic prefix (CP).

Each element on a resource grid is referred to as a resource element (RE) and a single resource element is indicated by one OFDM symbol index and one subcarrier index. A single RB is configured with $N\_symb^{DL} \times N\_SC^{RB}$ resource elements. The number ($N\_RB^{DL}$) of resource blocks included in the DL slot depends on a DL transmission bandwidth configured in a cell.

Figure 6:
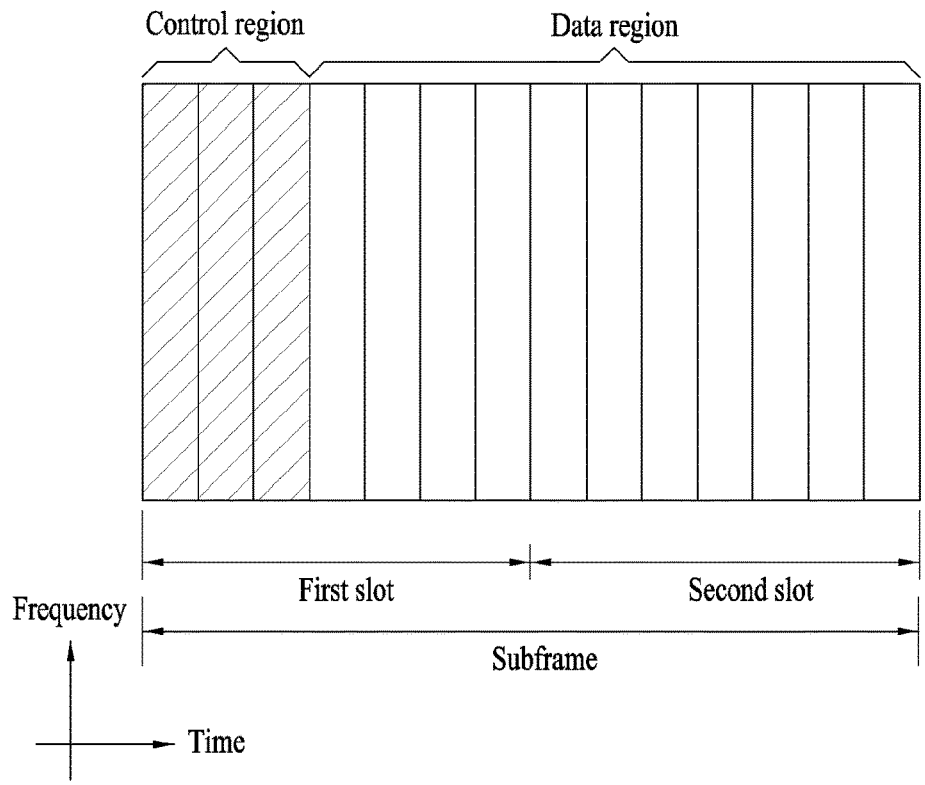
FIG. 6 illustrates a structure of a downlink radio frame used in an LTE system.

FIG. 6 illustrates a structure of a downlink radio frame.

Referring to FIG. 6, up to 3 (or 4) OFDM symbols located at a head part of a first slot of a subframe correspond to a control region to which a control channel is assigned. And, the rest of OFDM symbols correspond to a data region to which PDSCH (physical downlink shared channel) is assigned. For example, DL control channels used in the LTE system may include a PCFICH (physical control format indicator channel), a PDCCH (physical downlink control channel), a PHICH (physical hybrid ARQ indicator channel) and the like. The PCFICH is transmitted on a first OFDM symbol of a subframe and carries information on the number of OFDM symbols in the subframe used for control channel transmission. The PHICH carries an HARQ ACK/NACK (hybrid automatic repeat request acknowledgment/negative-acknowledgment) signal in response to UL transmission.

Control information transmitted on the PDCCH is called DCI (downlink control information). The DCI includes resource allocation information and other control information for a user equipment or a user equipment group. For instance, the DCI may include UL/DL scheduling information, UL transmission (Tx) power control command and the like.

The PDCCH carries transmission format and resource allocation information of a DL-SCH (downlink shared channel), transmission format and resource allocation information of a UL-SCH (uplink shared channel), paging information on a PCH (paging channel), system information on a DL-SCH, resource allocation information of a higher-layer control message such as a random access response transmitted on a PDSCH, a Tx power control command set for individual user equipments in a user equipment group, a Tx power control command, activation indication information of a VoIP (voice over IP) and the like. A plurality of PDCCHs may be transmitted in a control region. A user equipment can monitor a plurality of PDCCHs. The PDCCH is transmitted on aggregation of one or more consecutive CCEs (control channel elements). In this case, the CCE is a logical assignment unit used in providing the PDCCH with a coding rate based on a radio channel state. The CCE corresponds to a plurality of REGs (resource element groups). The PDCCH format and the number of PDCCH bits are determined depending on the number of CCEs. A base station determines the PDCCH format in accordance with DCI to be transmitted to a user equipment and attaches CRC (cyclic redundancy check) to control information. The CRC is masked with an identifier (e.g., RNTI (radio network temporary identifier)) in accordance with an owner or a purpose of use. For instance, if a PDCCH is provided for a specific user equipment, CRC may be masked with an identifier (e.g., C-RNTI (cell-RNTI)) of the corresponding user equipment. If a PDCCH is provided for a paging message, CRC may be masked with a paging identifier (e.g., P-RNTI (paging-RNTI)). If a PDCCH is provided for system information (particularly, SIC (system information block)), CRC may be masked with an SI-RNTI (system information-RNTI). In addition, if a PDCCH is provided for a random access response, CRC may be masked with an RA-RNTI (random access-RNTI).

Figure 7:
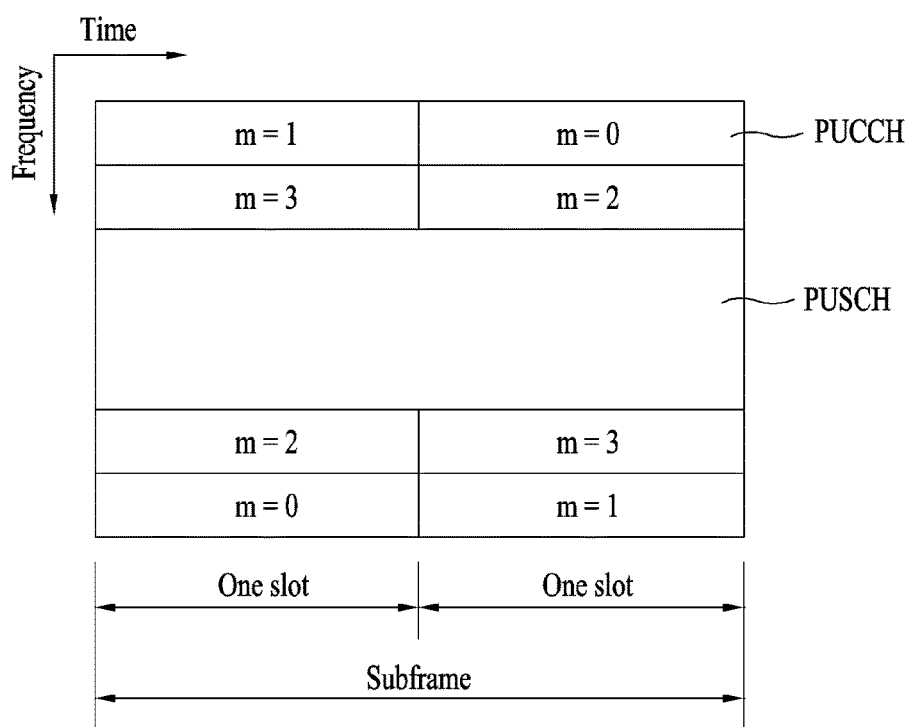
FIG. 7 illustrates a structure of an uplink radio frame used in an LTE system.

FIG. 7 illustrates a structure of an uplink subframe used in an LTE system.

Referring to FIG. 7, an uplink subframe includes a plurality (e.g., 2 slots) of slots. Each of the slots may include a different number of SC-FDMA symbols depending on a length of CP. The UL subframe may be divided into a data region and a control region in the frequency domain. The data region includes a PUSCH and is used to transmit such a data signal as audio and the like. The control region includes a PUCCH and is used to transmit UCI (uplink control information). The PUCCH includes an RB pair located at both ends of the data region on a frequency axis and is hopped on a slot boundary.

The PUCCH can be used to transmit the following control information.

SR (scheduling request): This is information used to request a UL-SCH resource and is transmitted using an OOK (on-off keying) scheme.

HARQ ACK/NACK: This is a response signal in response to a DL data packet on a PDSCH and indicates whether the DL data packet has been successfully received. 1-bit ACK/NACK is transmitted as a response to a single downlink codeword and 2-bit ACK/NACK is transmitted as a response to two downlink codewords.

CSI (channel state information): This is feedback information on a downlink channel. The CSI includes a channel quality indicator (CQI). MIMO (multiple input multiple output) related feedback information includes a rank indicator (RI), a precoding matrix indicator (PMI), a precoding type indicator (PTI) and the like. 20-bit is used in each subframe.

The amount of control information (UCI) that a user equipment can transmit in a subframe depends on the number of SC-FDMA symbols available for transmission of the control information. The SC-FDMA symbols available for the transmission of the control information correspond to the rest of SC-FDMA symbols except SC-FDMA symbols used for transmitting a reference signal in the subframe. In case of a subframe in which a sounding reference signal (SRS) is configured, the last SC-FDMA symbol of the subframe is excluded from the SC-FDMA symbols available for the transmission of the control information. The reference signal is used for coherent detection of a PUCCH.

Hereinafter, D2D (UE-to-UE) communication will be described.

A D2D communication scheme can be mainly classified as a scheme supported by a network/coordination station (e.g., base station) and a scheme not supported by the network/coordination station.

Referring to FIG. 8, FIG. 8(a) illustrates a scheme in which the network/coordination station intervenes in transmission and reception of control signals (e.g., grant message), HARQ, channel state information, etc. and user equipments that perform D2D communication transmit and receive data only. On the other hand, FIG. 8(b) illustrates a scheme in which the network provides minimum information (e.g., D2D connection information available in a corresponding cell) only but the user equipments that perform D2D communication establish links to transmit and receive data.

Figure 9:
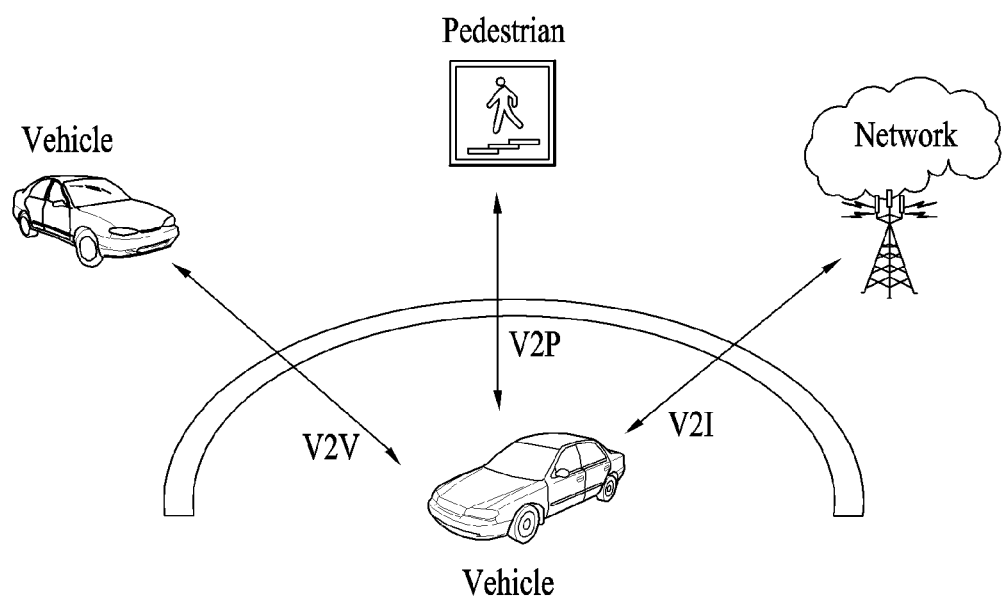
FIG. 9 is a reference diagram to describe a V2V scenario.

FIG. 9 is a diagram illustrating a V2X (vehicle to everything) communication environment.

If a vehicle accident occurs, many lives are lost, and serious property damage is caused. Thus, the demand for a technology capable of securing safety of pedestrians as well as safety of people in a vehicle has been increased. In addition, a technology based on hardware and software dedicated to the vehicle has been grafted onto the vehicle.

Recently, the LTE-based V2X (vehicle-to-everything) communication technology, which has been evolved from 3GPP, reflects the tendency in which the information technology (IT) is grafted onto the vehicle. A connectivity function is applied to some kinds of vehicles, and efforts are continuously made to research and develop vehicle-to-vehicle (V2V) communication, vehicle-to-infrastructure (V2I) communication, vehicle-to-pedestrian (V2P) communication, and vehicle-to-network (V2N) communication with the evolution of communication functions.

According to V2X communication, a vehicle consistently broadcasts information on its own locations, speeds, directions, etc. After receiving the broadcasted information, a nearby vehicle utilizes the information for accident prevention by recognizing movements of other adjacent vehicles.

That is, in a similar manner that an individual person carries a user equipment such as a smartphone, a smartwatch or the like, a specific type of user equipment (UE) can be installed in each vehicle. Here, a UE installed in a vehicle means a device that actually receives communication services from a communication network. For example, the UE installed in the vehicle can be accessed to an eNB in E-UTRAN and provided with communication services.

However, there are various items that should be considered for a process for implementing V2X communication in a vehicle. This is because astronomical costs are required for the installation of traffic safety facilities such as a V2X base station and the like. That is, to support V2X communication on all roads where the vehicle can move, it is necessary to install hundreds or thousands of V2X base stations or more. Moreover, since each network node accesses the Internet or a centralized control server using a wired network basically for stable communication with a server, installation and maintenance costs for the wired network are also high.

Hereinafter, resource allocation for performing V2X communication in the present invention is described. Although the present invention is described by being limited to a V2X scenario for clarity of the description, the present invention is applicable to other communication systems such as Device-to-Device (D2D) communication.

Figure 10:
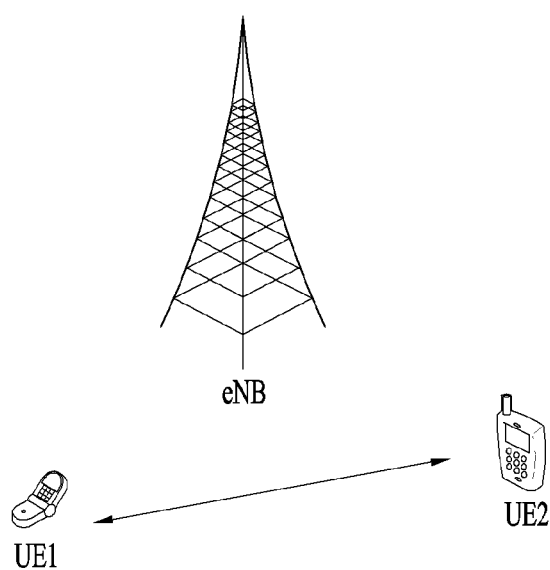
FIG. 10 and FIG. 11 are reference diagrams to describe a resource pool on a D2D scenario.

FIG. 10 is a reference diagram to describe UE-to-UE direct communication. When a UE performs communication with another UE using a direct wireless channel, as shown in FIG. 10, the present invention proposes a method of determining a resource to use for communication. This can be named UE-to-UE direct signal transmission/reception or Device-to-Device (D2D) communication, and further named a sidelink to be distinguished from Downlink (DL) and Uplink (UL) of the existing cellular communication. Furthermore, communication among multiple devices may be named Vehicle-to-Vehicle (V2V) communication in association with vehicles. Hence, although a UE means a user's UE (or car), if a network equipment such as an eNB transmits/receives a signal according to a UE-to-UE communication methodology, the network equipment can be regarded as a sort of UE to which the present invention is applicable. Moreover, an eNB can receive a D2D signal transmitted by a UE. Furthermore, a signal transmitting/receiving method of a UE designed for D2D transmission is applicable to an operation for a UE to transmit data to an eNB.

In the following description, UE1 may operate in a manner of selecting a resource unit corresponding to a specific resource from a resource pool meaning a set of a series of resources and transmitting a D2D signal using the corresponding resource unit. UE2 that is an Rx UE may receive a configuration of a resource pool for the UE1 to transmit a D2D signal and detect a signal of the UE1 within the corresponding resource pool. Here, if the UE1 is in a connection range of a base station, the UE1 can be informed of the resource pool by the base station. If the UE1 is out of the connection range of the base station, the UE1 may be informed of the resource pool by another UE or the resource pool may be determined as a previously determined resource. Generally, a resource pool is configured in a plurality of resource units. Each UE may select a single or a plurality of resource units and use the selected resource unit(s) for D2D signal transmission of its own.

Figure 11:
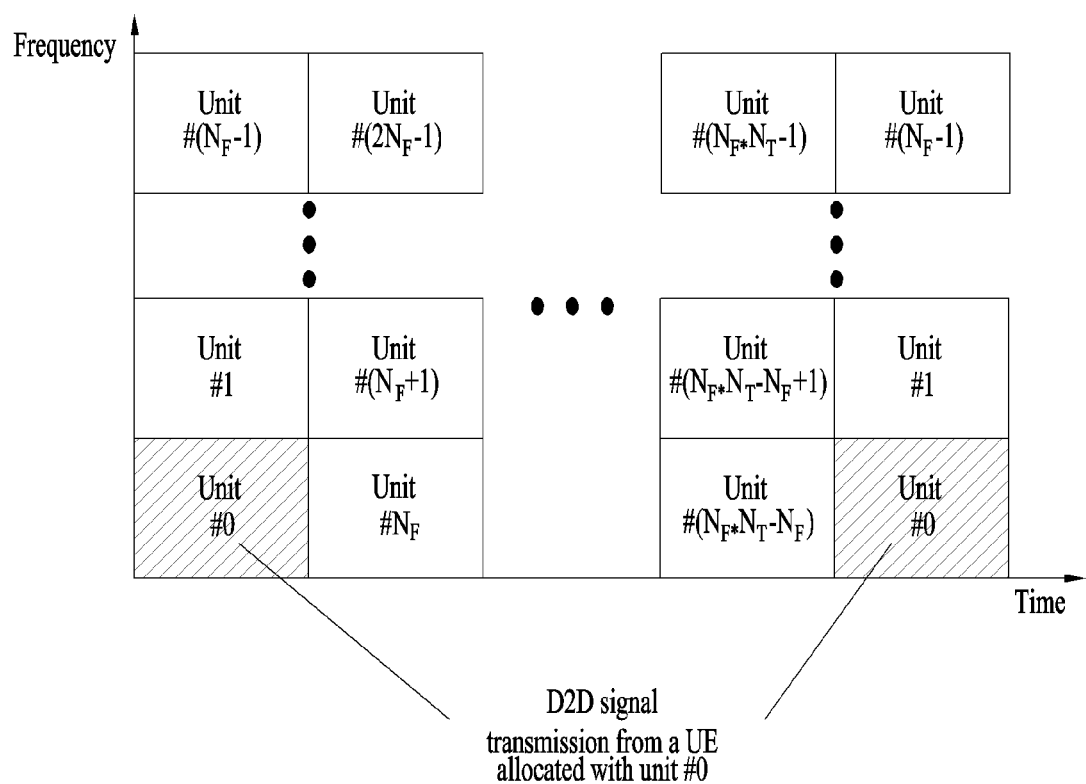

FIG. 11 shows one example of a configuration of resource unit. FIG. 11 illustrates a case that total NF*NT resource units are defined in a manner of dividing a full frequency resource into NF units and dividing a full time resource into NT units. In FIG. 11, a corresponding resource pool is repeated every NT subframes. Typically, as shown in FIG. 11, a single resource unit may appear in a manner of being repeated periodically. Or, an index of a physical resource unit, to which one logical resource unit is mapped to obtain a diversity effect in a time or frequency dimension, may change in a predetermined pattern according to a time. In such a resource unit structure, a resource pool may mean a set of resource units usable for a transmission by a UE intending to transmit a D2D signal.

Furthermore, a resource pool can be subdivided into various types. First of all, a resource pool can be divided according to a content of a transmitted D2D signal in each resource pool. For example, a content of a D2D signal can be classified as follows. And, a separate resource pool may be configured for each content.

Scheduling Assignment (SA) (or sidelink control channel): Signal including information such as a location of a resource used for transmission of a following D2D data channel by each transmitting (Tx) UE, a Modulation and Coding Scheme (MCS) required for demodulation of a data channel, an MIMO transmission methodology and the like. Such an SA signal can be transmitted on the same resource unit by being multiplexed with D2D data. In this case, an SA resource pool may mean a resource pool configured with a resource on which an SA is transmitted by being multiplexed with D2D data.

D2D data channel (sidelink shared channel): A resource pool configured with a resource used in transmitting user data by a Tx UE using a resource designated through SA. If a transmission on the same resource unit by being multiplexed with D2D data is possible, only a D2D data channel of a type except SA information is transmitted in a resource pool for the D2D data channel So to speak, a resource element used in transmitting SA information on an individual resource unit within an SA resource pool is still used to transmit D2D data in a D2D data channel resource pool.

Discovery message (or sidelink discovery channel): A resource pool for a message through which a Tx UE enables an adjacent UE to discover the Tx UE itself by transmitting information such as an ID of the Tx UE and the like.

Synchronization signal/channel (or, sidelink synchronization signal, sidelink broadcast channel): A resource pool for a signal/channel to achieve an object that a Tx UE transmits a synchronization signal and information related to synchronization to enable an Rx (receiving) UE to match up time/frequency synchronization with that of the Tx UE.

Although SA and data may use a resource pool separated on a subframe, if a UE can simultaneously transmit SA and data in a single frame, two types of resource pools can be configured in the same subframe.

Moreover, in case that the aforementioned D2D signal content is identical, a different resource pool is usable according to a transmission/reception attribute of the D2D signal. For example, despite the same D2D data channel or discovery message, it can be divided into a different resource pool again depending on a transmission timing determining methodology (whether a D2D signal is transmitted at a reception timing of a synchronization reference signal, whether a D2D signal is transmitted by applying a constant timing advance at a repletion timing of a synchronization reference signal, etc.), a resource allocation methodology (e.g., whether a transmission resource of an individual signal is designated to an individual Tx UE by an eNB, or whether an individual Tx UE selects an individual signal transmission resource from a resource pool by itself), a signal format (e.g., the number of symbols occupied in a single subframe by each D2D signal, the number of subframes used for transmission of a single D2D signal), a signal strength from an eNB, a transmit power level of a D2D UE and the like.

For clarity of description, a method for an eNB to directly indicate a transmission resource of a D2D Tx UE in D2D communication is defined as Mode 1. And, a method for a UE to directly select a transmission resource, when a transmission resource region is configured in advance or an eNB designates a transmission resource region, is defined as Mode 2. In case of D2D discovery, a case that an eNB directly indicates a resource is defined as Type 2. And, a case that a UE directly selects a transmission resource from a previously configured resource region or a resource region indicated by an eNB is defined as Type 1.

Moreover, as described above, D2D may be called sidelink, SA may be called Physical Sidelink Control Channel (PSCCH), D2D synchronization signal may be called Sidelink Synchronization Signal (SSS), control channel carrying most basic information, which is transmitted together with SSS before D2D communication, may be called Physical Sidelink Broadcast Channel (PSBCH) or Physical D2D Synchronization Channel (PD2DSCH).

Furthermore, a signal for a specific UE to announce that it is located nearby (here, ID of the specific UE may be included in this signal) or such a channel may be called Physical Sidelink Discovery Channel (PSDCH).

According to Rel. 12 on LTE system, only a D2D communication UE transmits PSBCH together with SSS in D2D, whereby measurement of SSS is performed using DMRS of PSBCH. An out-coverage UE measures DMRS of PSBCH and then determines whether to become a synchronization source by measuring RSRP of this signal and the like.

It is expected that control and data channels coexist in V2X communication. It is assumed that when control and data channels are associated with each other, multiple vehicles transmit periodic messages. Assuming that a vehicle is a UE, the UE may know the resource locations of currently transmitted messages by decoding the control channel or performing energy sensing on the data channel. In addition, the UE may know even the resource locations to be used by other transmitting UEs.

As more and more communication devices have required higher communication capacity to transmit and receiving signals, the necessity for mobile broadband communication much improved than the existing radio access technology (RAT) has increased. In addition, massive machine type communications (MTC) capable of providing various services anytime and anywhere by connecting a number of devices or things has been considered as an important issue in the next-generation communication systems. Moreover, a communication system design capable of supporting services/UEs sensitive to reliability and latency has been discussed. The introduction of new-generation RAT considering enhanced mobile broadband communication, massive MTC, ultra-reliable and low-latency communication (URLLC), etc. has been discussed. In the present disclosure, the corresponding technology is referred to as new RAT (NR) for simplicity.

Based on the above-described technical features, the present disclosure describes a method of using a multiple-input multiple-output (MIMO) space-time block code (STBC) technique in V2X or uplink communication where uplink resources are used.

First, a method of obtaining diversity by applying the STBC to multiple antennas in communication using uplink resources will be described. V2X or uplink communication may be taken as a representative example of the communication using uplink resources. In addition, the method of obtaining diversity using multiple antennas can be mainly divided into two types. The first one is closed-loop MIMO technology where channel feedback is used, and the second one is open-loop MIMO technology without channel feedback.

In general, the closed-loop MIMO technology has better performance than that of the open-loop MIMO technology. However, to this end, accurate channel feedback information should be guaranteed. In V2X communication, if many vehicles attempt to obtain diversity using multiple antennas, a large amount of feedback may be required for the vehicles to obtain feedback information in each vehicle link. In this case, the open-loop MIMO technology with no feedback may be efficient instead of using many resources for the feedback.

In V2X communication, a channel between vehicles may be rapidly changed due to high-speed vehicles. Since channel feedback may become inaccurate when the channel is rapidly changed, it may be better to use the open-loop MIMO rather than the closed-loop MIMO in terms of performance.

Therefore, the present disclosure focuses on an STBC-based scheme, which is a representative example of the open-loop MIMO scheme. The STBC is the abbreviation for the Space-Time Block Code as describe above, and it is a technique of creating and using an orthogonal or quasi-orthogonal time-space resource using non-orthogonal space and time resources. According to this technique, time resources with almost same channels are assumed to be equal to each other, and then space resources are configured to be orthogonal or quasi-orthogonal using that the channels are equal to each other.

The STBC family is mainly divided into two types: the first one is the STBC where orthogonal transmission is performed using time-domain resources and the second one is a space-frequency block code (SFBC) where orthogonal transmission is performed using frequency-domain resources.

For example, assuming that there are two transmission antennas, the Alamouti scheme may be used. According to the Alamouti scheme, a data vector $[x_1\ x_2]^T$ is transmitted at the first timing, and a data vector $[\ \ldots\ x^*_2\ x^*_1]^T$ is transmitted at the second timing. Assuming that there is one reception antenna and the same channel is used at the first and second timings, received signals may be expressed as shown in Equation 1.

$$y_1 = h_1 x_1 + h_2 x_2 + n_1$$

$$y_2 = -h_1 x^*_2 + h_2 x^*_1 + n_2 \qquad \text{[Equation 1]}$$

In Equation 1, $y_1$ indicates a signal received at the first timing and $y_2$ indicates a signal received at the second timing. In addition, $n_1$ indicates a thermal noise at the first timing, and $n_2$ indicates a thermal noise at the second timing. Moreover, $h_1$ indicates a channel from antenna 1 to the reception antenna, and $h_2$ indicates a channel from antenna 2 to the reception antenna. In this case, by conjugating $y_2$, Equation 1 may be modified as shown in Equation 2.

$$\begin{bmatrix} y_1 \\ y_2 \end{bmatrix} = \begin{bmatrix} h_1 & h_2 \\ h^*_2 & -h^*_1 \end{bmatrix} \begin{bmatrix} x_1 \\ x_2 \end{bmatrix} + \begin{bmatrix} n_1 \\ n^*_2 \end{bmatrix} \qquad \text{[Equation 2]}$$

From Equation 2, it can be seen that space resources are changed to be orthogonal to each other and diversity gain is doubled compared to when the data vector $[x_1\ x_2]^T$ is transmitted at the first timing and the data vector $[x_1\ x_2]^T$ is also transmitted at the second timing.

Figure 12:
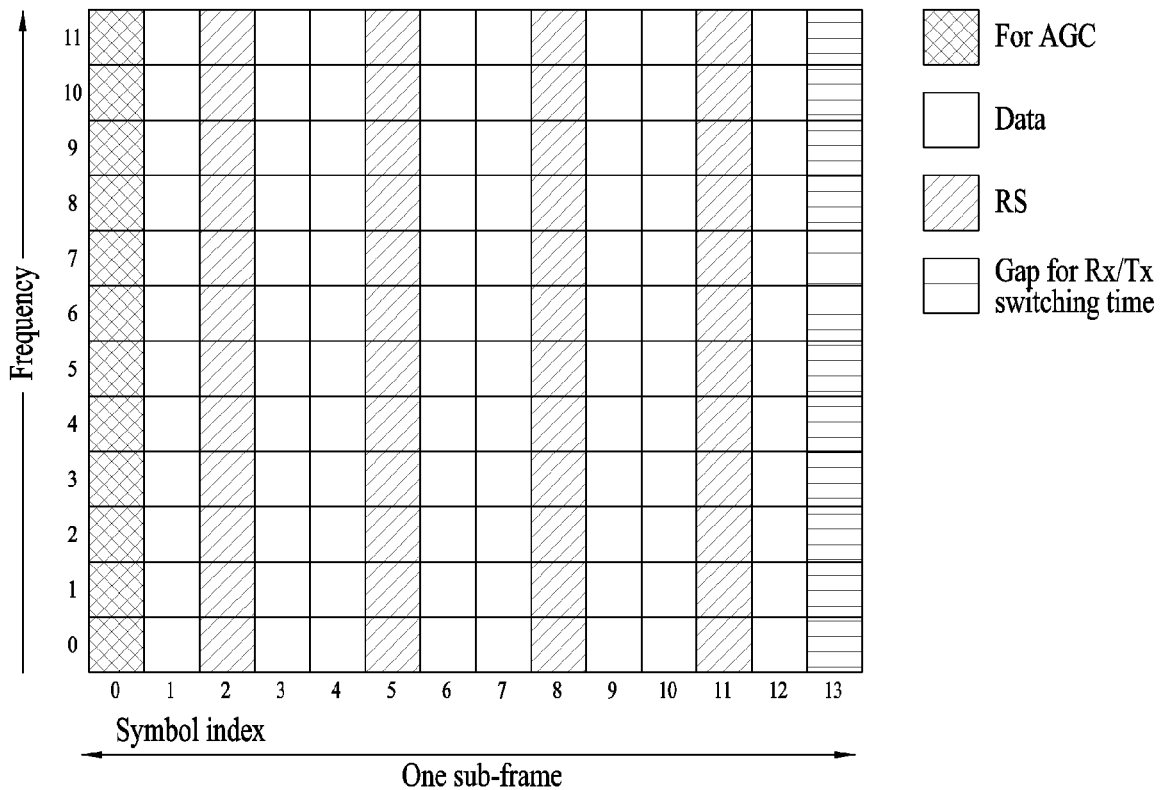
FIGS. 12 to 17 are reference diagrams illustrating reference signal allocation according to an embodiment of the present disclosure.

In Rel-14 LTE V2X, the first OFDM symbol in one subframe is used for automatic gain control (AGC) and the last OFDM symbol therein is reserved for an Rx/Tx switching time. That is, data and reference signals are mapped to OFDM symbols except the two OFDM symbols. FIG. 12 shows a frame structure in Rel-14 LTE V2X.

When the SFBC is applied to the frame structure shown in FIG. 12, there may be no problem in data mapping. For example, assuming that frequency resources #0 and #1 are used for data in OFDM symbol #1 based on the Alamouti scheme, orthogonal transmission may be achieved since the two resources may have similar channels.

However, there is an issue related to a peak-to-average power ratio (PAPR) in the case of the SFBC. That is, assuming that single carrier frequency division multiple access (SC-FDMA) is applied to V2X communication, the PAPR lowered by discrete Fourier transform (DFT) spreading may be increased again by orthogonal SFBC mapping.

Meanwhile, in the case of the STBC, the PAPR may be lowered depending on how data mapping is performed. However, in the case of the STBC, it may be difficult to perform data mapping in the frame structure shown in FIG. 12. For example, in the case of an STBC-based scheme where the same channel is assumed, it is desirable that the STBC is applied to OFDM symbols #1 and #2, but since a reference signal is mapped to OFDM symbol #2, data cannot be mapped thereto. Thus, data should be mapped to OFDM symbol #3 where it is expected that the most similar channel is present. When data are mapped to OFDM symbols #1 and #3 and the STBC is applied therebetween, performance may be degraded due to a decrease in the channel similarity, compared to when data are mapped to OFDM symbols #1 and #2 and the STBC is applied therebetween.

Based on the above-described features, the embodiments of the present disclosure will be described in the following.

First Embodiment

According to the first embodiment of the present disclosure, when the STBC is applied using N antennas, N+1 consecutive OFDM symbols may be set to one set. In each set, data are mapped to N consecutive OFDM symbols to apply the STBC to the N consecutive OFDM symbols, and a reference signal is mapped to the remaining one OFDM symbol for channel estimation.

For example, assuming that there are two antennas, if the first and last OFDM symbols are respectively used for the AGC and the Rx/Tx switching time as in 3GPP Rel-14 LTE V2X, the remaining 12 OFDM symbols may be grouped into four sets: {#1, #2, #3}, {#4, #5, #6}, {#7, #8, #9}, and {#10, #11, #12}.

Figure 13:
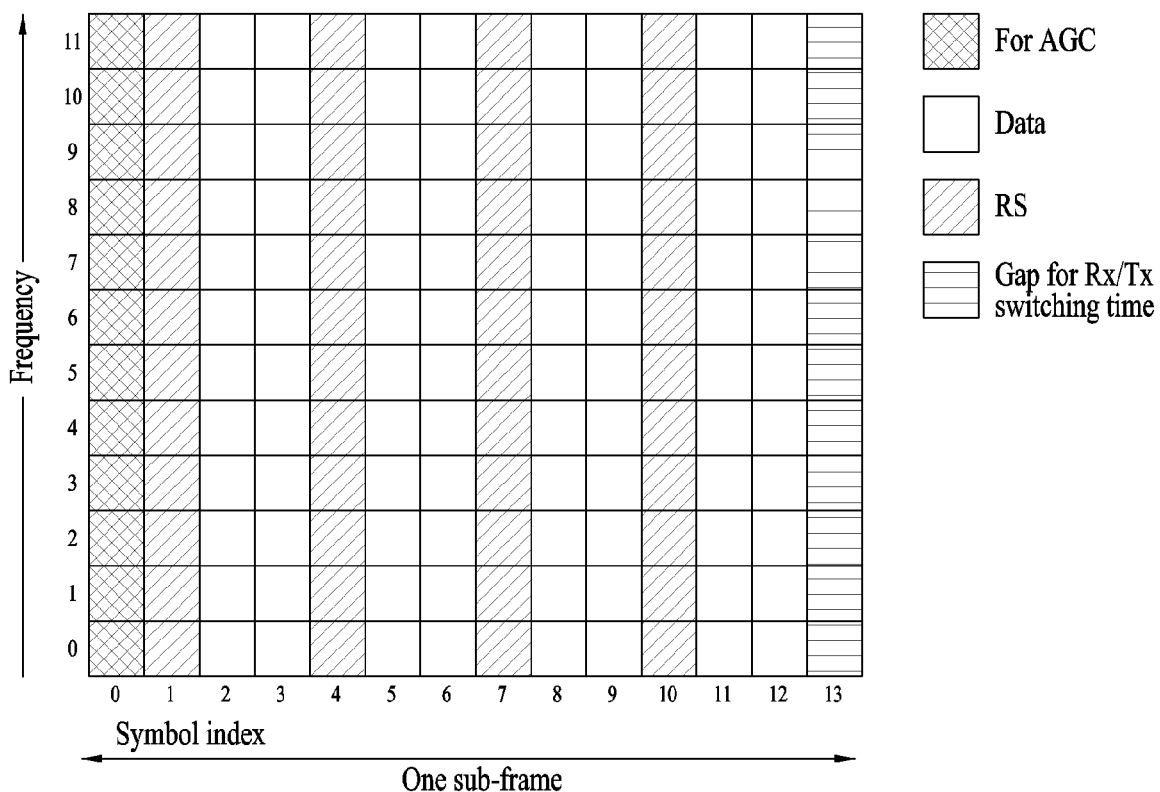

In this case, if the first embodiment is applied, the following two cases may be considered. In the first case, DMRSs are mapped to OFDM symbols #3, #6, #9, and #12, and in the second case, DMRSs are mapped to OFDM symbols #1, #4, #7, and #10. In the above two cases, data are mapped to the remaining consecutive OFDM symbols and the STBC is applied thereto. According this frame structure, reference signals may be mapped as uniformly as possible by repeating the same format for each set, thereby improving channel estimation performance. FIG. 13 shows an example in which DMRSs are mapped to OFDM symbols #1, #4, #7, and #10.

As another example, assuming that there are four antennas, if the first and last OFDM symbols are respectively used for the AGC and the Rx/Tx switching time as in Rel-14 LTE V2X, 10 OFDM symbols except two OFDM symbols among the remaining 12 OFDM symbols may be grouped into two sets.

Assuming that reference signals need to be mapped to four OFDM symbols to estimate a phase offset as in Rel-14 LTE V2X, a reference signal may be mapped to one OFDM symbol in each of the two sets and each of the two OFDM symbols which are not included in the sets.

The following two examples may be considered for the grouping.

Figure 14:
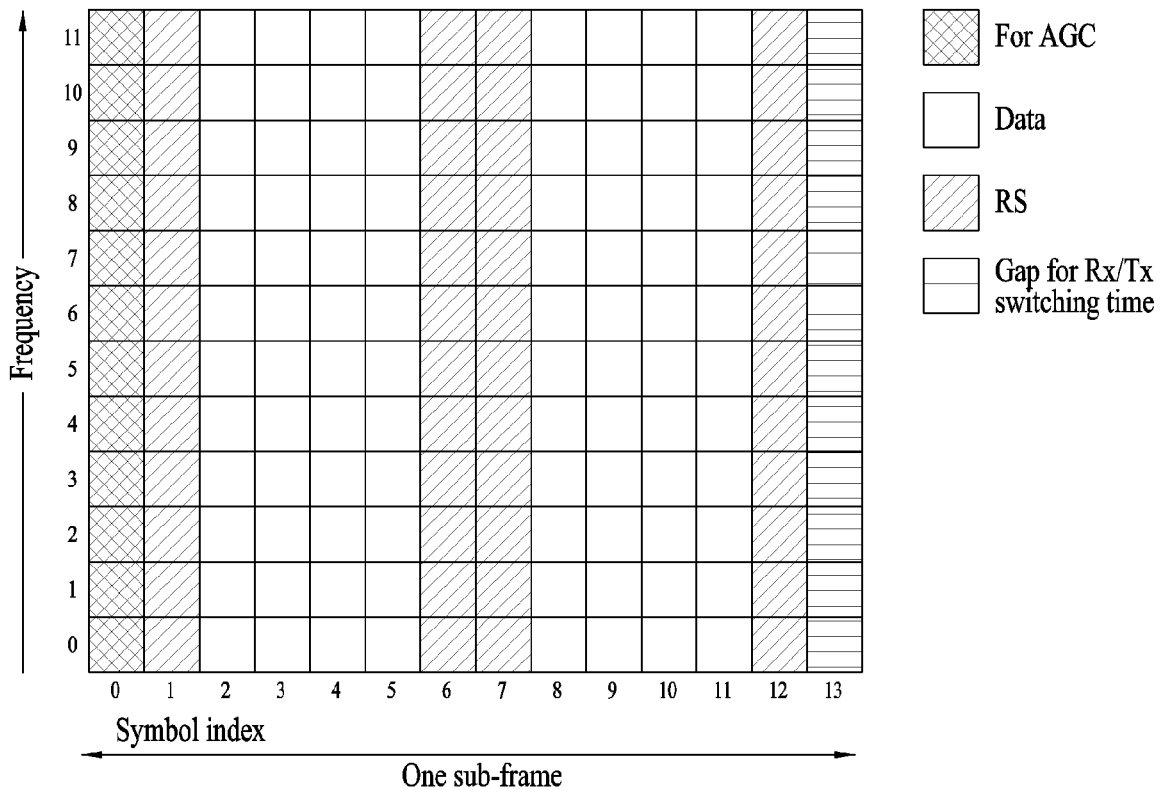

In the first example, two sets may be defined as follows: {#1, #2, #3, #4, #5} and {#7, #8, #9, #10, #11}. Reference signals may be mapped to OFDM symbols #1 and #7 in the above sets and the remaining OFDM symbols, i.e., OFDM symbols #6 and #12. Data may be mapped to consecutive OFDM symbols, i.e., OFDM symbols #2, #3, #4, and #5 and OFDM symbols #8, #9, #10, and #11, and the STBC may be applied between the consecutive OFDM symbols. FIG. 14 shows a reference signal mapping format based on the above-described grouping.

Figure 15:
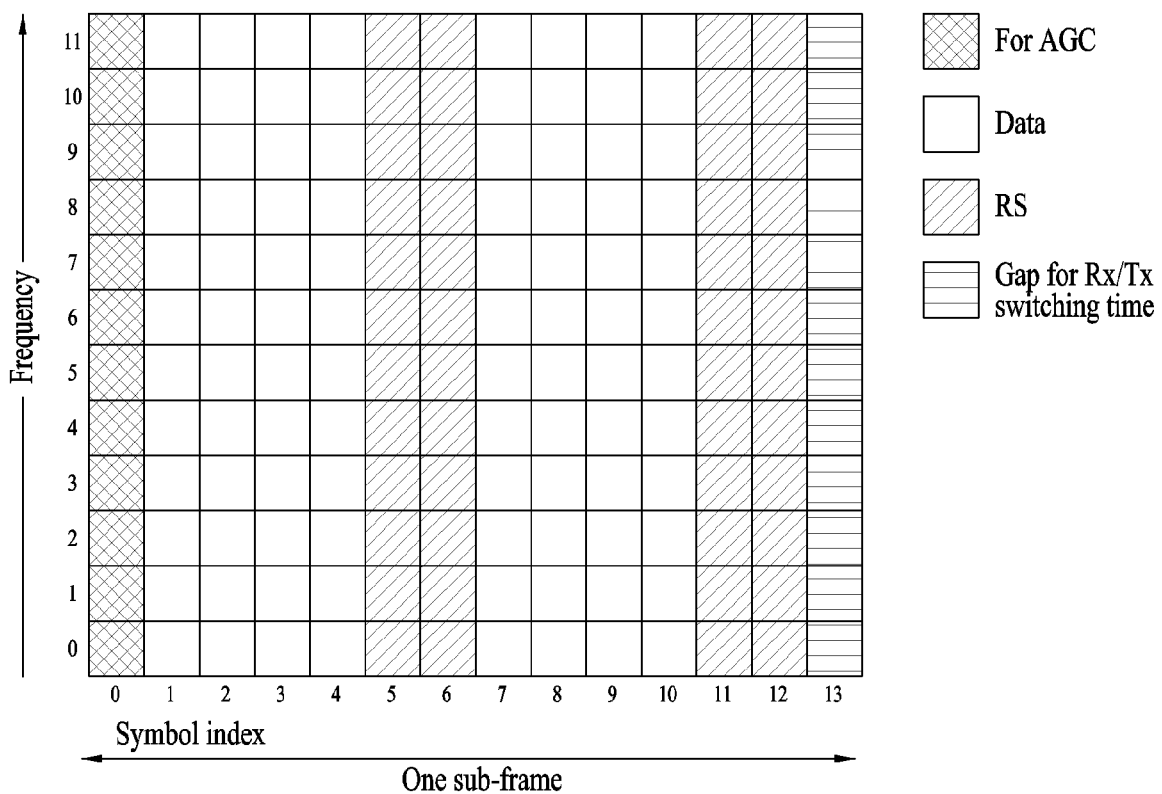

In the same grouping, reference signals may be mapped to OFDM symbols #5 and #11 in the above sets and the remaining OFDM symbols, i.e., OFDM symbols #6 and #12. Data may be mapped to consecutive OFDM symbols, i.e., OFDM symbols #1, #2, #3, and #4 and OFDM symbols #7, #8, #9, and #10, and the STBC may be applied between the consecutive OFDM symbols. FIG. 15 shows a reference signal mapping format based on the above-described grouping.

Figure 16:
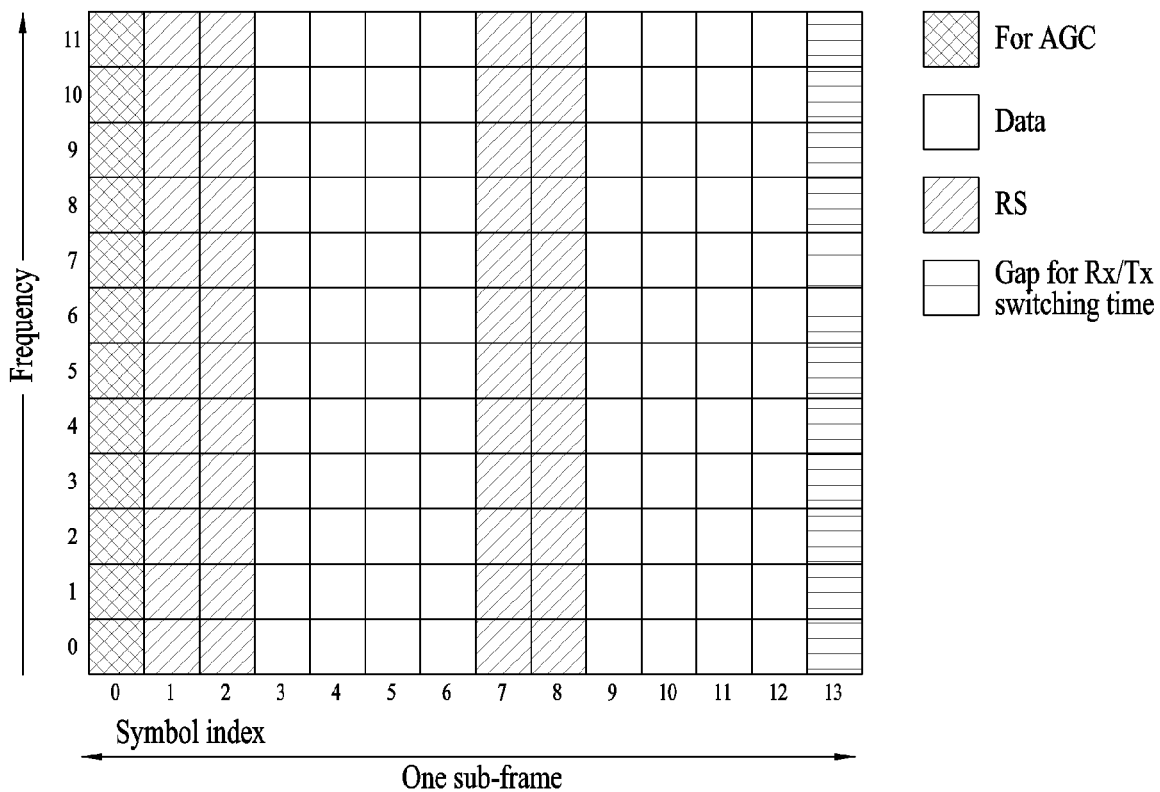

In the second example, two sets may be defined as follows: {#2, #3, #4, #5, #6} and {#8, #9, #10, #11, #12}. Reference signals may be mapped to OFDM symbols #2 and #8 in the above sets and the remaining OFDM symbols, i.e., OFDM symbols #1 and #7. Data may be mapped to consecutive OFDM symbols, i.e., OFDM symbols #3, #4, #5, and #6 and OFDM symbols #9, #10, #11, and #12, and the STBC may be applied between the consecutive OFDM symbols. FIG. 16 shows a reference signal mapping format based on the above-described grouping.

The two grouping examples are proposed to improve channel estimation performance Specifically, reference signals are mapped as uniformly as possible by repeating the same format for each set, thereby improving the channel estimation performance.

Second Embodiment

According to the second embodiment of the present disclosure, when transmission is performed using four antennas, the SFBC may be applied to two antenna ports using two resources as if the SFBC is applied to LTE downlink, but among four antenna ports, two antenna ports may be alternately used. This transmission method may be similarly applied when the STBC is applied to time-domain resources.

In this case, since orthogonal transmission is performed on two resources rather than four resources, the STBC may be applied to two consecutive data resources.

To this end, the following two methods may be considered.

It is assumed that the first and last OFDM symbols are respectively used for the AGC and the Rx/Tx switching time as in Rel-14 LTE V2X. According to the first method, data are mapped to {#1, #2}, {#4, #5}, {#7, #8}, and {#10, #11}, and the STBC is applied every two consecutive OFDM symbols. In this case, among the four antenna ports, two antenna ports are used for {#1, #2} and {#7, #8}, and the remaining two antenna ports are used for {#4, #5} and {#10, #11} in order to apply the STBC thereto. Thereafter, reference signals are mapped to the remaining OFDM symbols, i.e., OFDM symbols #3, #6, #9, and #12.

According to the second method, data are mapped to {#2, #3}, {#5, #6}, {#8, #9}, and {#11, #12}, and the STBC is applied every two consecutive OFDM symbols. In this case, among the four antenna ports, two antenna ports are used for {#2, #3} and {#8, #9}, and the remaining two antenna ports are used for {#5, #6} and {#11, #12} in order to apply the STBC thereto. Thereafter, reference signals are mapped to the remaining OFDM symbols, i.e., OFDM symbols #1, #4, #7, and #10.

In the above-described first and second embodiments, it is assumed that reference signals are mapped to four OFDM symbols. The reason why reference signals are mapped to four OFDM symbols in Rel-14 LTE V2X is that considering that a phase offset is rapidly changed due to the Doppler shift when a vehicle UE moves at a high speed, the phase offset can be adjusted easily if the number of reference signals mapped to time resources increases.

However, when the STBC is used, it may be assumed that diversity is obtained between time units since a channel is rapidly changed between the time units even if the STBC is not applied to high-speed UEs. Assuming that the STBC is only meaningful at a low speed, the STBC may be applied to low-speed UEs in the actual system. When the STBC is applied to the low-speed UEs, it is not necessary to map reference signals to four OFDM symbols. In this case, as in the conventional uplink communication, reference signals may be mapped to two OFDM symbols, and the remaining OFDM symbols may be used for data to improve the efficiency of transmission.

The speed (i.e., low speed) at which a UE can use the STBC may be preconfigured or indicated by higher layer signaling.

Based on the above assumption, mapping of reference signals and data when two OFDM symbols are used will be described in the third and fourth embodiments.

Third Embodiment

Figure 17:
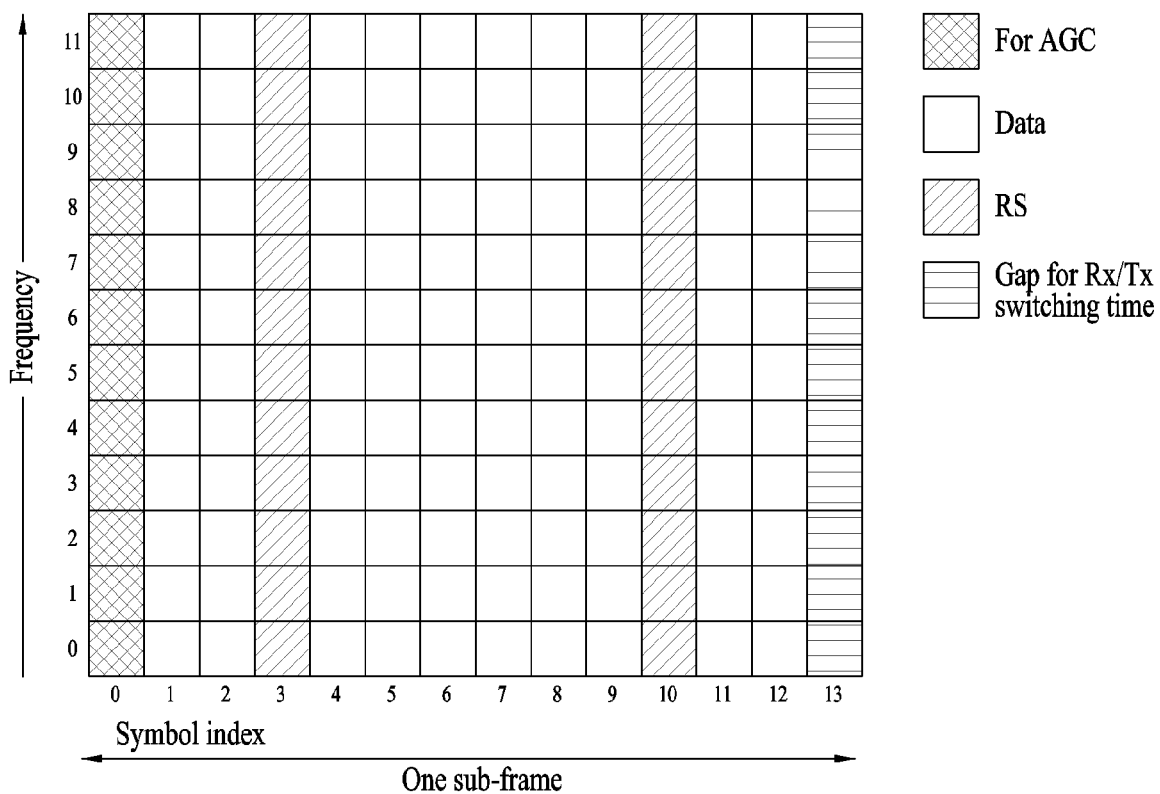

According to the third embodiment of the present disclosure, when two antenna ports are used for the STBC, reference signals are mapped to OFDM symbols #3 and #10, and data are mapped to the remaining OFDM symbols. In this case, the first and last OFDM symbols are respectively used for the AGC and the Rx/Tx switching time as in Rel-14 LTE V2X. The STBC is applied between every two consecutive OFDM symbols among the remaining OFDM symbols, i.e., {#1, #2}, {#4, #5}, {#6, #7}, {#8, #9}, and {#11, #12}. By uniformly mapping the reference signals to OFDM symbols #3 and #10, channel estimation performance may be improved. FIG. 17 shows such a reference signal and data mapping format.

Fourth Embodiment

When four antennas are used for the STBC, if the first and last OFDM symbols are respectively used for the AGC and the Rx/Tx switching time as in Rel-14 LTE V2X and reference signals are mapped to two OFDM symbols, 10 OFDM symbols remain. Assuming that data are mapped to all the remaining 10 OFDM symbols, if orthogonal transmission is performed every four OFDM symbols, two OFDM symbols remain. If it is unable to achieve performance similar to that of diversity 4 from the remaining two OFDM symbols, performance degradation may occur since the actual performance depends on transmission in the remaining two OFDM symbols.

To solve this problem, the above-described second embodiment may be applied. That is, when four antennas are used, the SFBC may be applied to two antenna ports using two resources as if the SFBC is applied to LTE downlink, but among four antenna ports, two antenna ports may be alternately used as described in the second embodiment. This transmission method may be similarly applied when the STBC is applied to time-domain resources.

In this case, since orthogonal transmission is performed on two resources rather than four resources, the STBC may be applied to two consecutive data resources.

For example, when the STBC is applied using four antennas based on the format of FIG. 17, reference signals are mapped to OFDM symbols #3 and #10, and data are mapped to the remaining OFDM symbols. In this case, the first and last OFDM symbols are respectively used for the AGC and the Rx/Tx switching time as in Rel-14 LTE V2X. The STBC is applied between every two consecutive OFDM symbols among the remaining OFDM symbols, i.e., {#1, #2}, {#4, #5}, {#6, #7}, {#8, #9}, and {#11, #12}. In this case, among the four antenna ports, two antenna ports are used for {#1, #2}, {#6, #7}, and {#11, #12}, and the remaining two antenna ports are used for {#4, #5} and {#8, #9} in order to apply the STBC thereto. By uniformly mapping the reference signals to OFDM symbols #3 and #10, channel estimation performance may be improved.

When the third or fourth embodiment is applied, the density of reference signals may be set to two OFDM symbols by assuming that the STBC is used for a low-speed UE even though another transmission uses four OFDM symbols. When it is indicated that the STBC is performed based thereon, the above-described third or fourth embodiment where a low reference signal density is assumed may be automatically applied with no indication of different reference signal density.

In the following, a description will be given of reference signal mapping when multiple ports are used. Since LTE V2X assumes one transmission antenna, a reference signal is mapped for one port. However, when the STBC or SFBC is used, two or more antenna ports are used, and thus a reference signal need to be mapped for each antenna port.

When reference signals are time division multiplexed (TDM) between ports, the time density of the reference signals is decreased with respect to one port. Thus, it is not suitable for compensating for a phase offset due to the Doppler shift caused by mobility in V2X communication. Therefore, it is desirable to apply frequency division multiplexing (FDM) or code division multiplexing (CDM). Not only may this be applied to all of the first to fourth embodiments of the present disclosure, but it may be applied to an OFDM symbol to which a reference signal is mapped.

Figure 18:
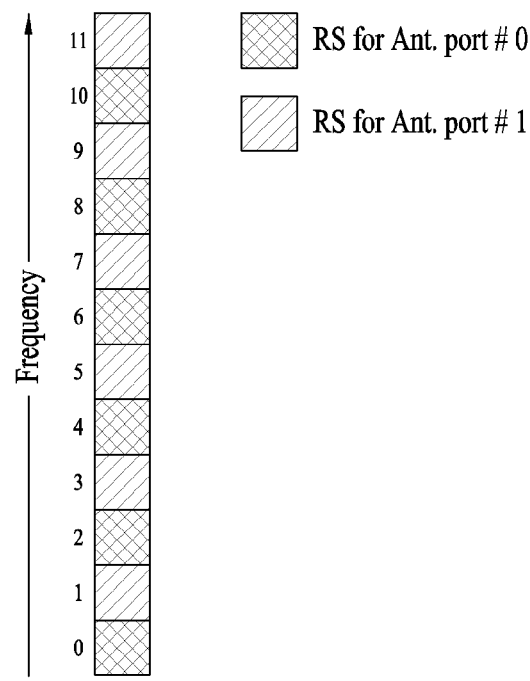
FIGS. 18 and 19 are reference diagrams for explaining comb-type mapping according to an embodiment of the present disclosure.
Figure 19:
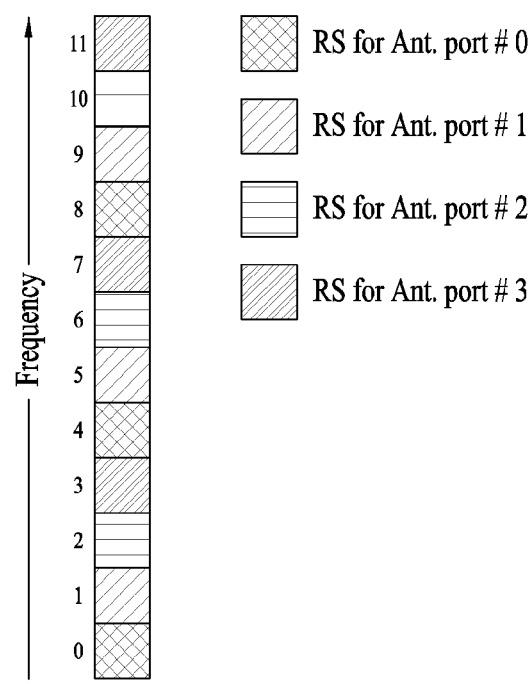

For example, it is assumed that FDM is applied. When N antennas are used for the STBC or SFBC, if the FDM is used for reference signal mapping, reference signals for the individual antenna ports may be mapped to OFDM symbols where the reference signals are to be mapped in an N-comb manner FIG. 18 shows an example in which two antennas are used for the STBC or SFBC, and FIG. 19 shows an example in which four antennas are used for the STBC or SFBC. The comb mapping may uniformly arrange reference signals for individual ports in the frequency domain, thereby improving channel estimation performance.

Figure 20:
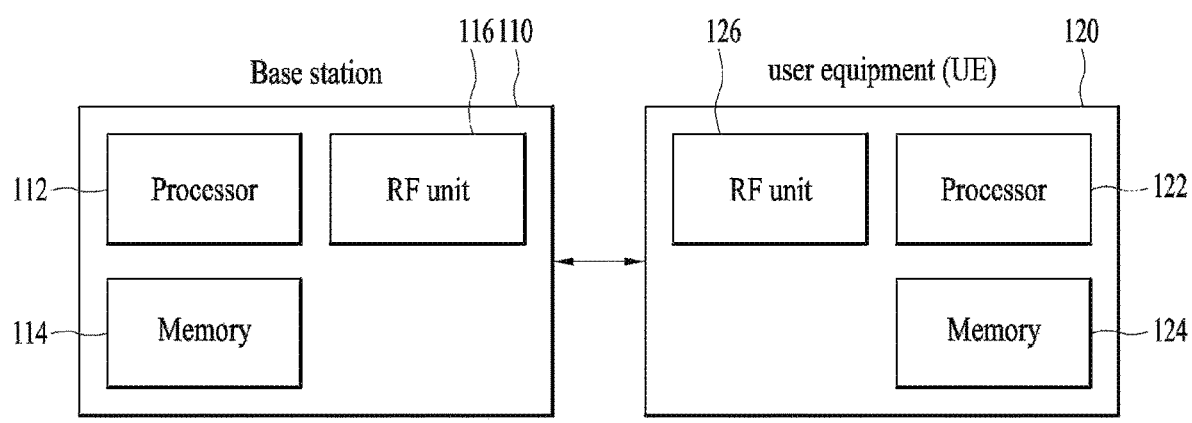
FIG. 20 shows a base station and a user equipment applicable to one embodiment of the present invention.

FIG. 20 illustrates a base station (BS) and a user equipment (UE) applicable to an embodiment of the present invention.

If a relay node is included in a wireless communication system, backhaul link communication is performed between the BS and the relay node, and access link communication is performed between the relay node and the UE. Therefore, the BS or UE shown in the drawing may be replaced with the relay node in some cases.

Referring to FIG. 20, a wireless communication system includes a base station (BS) 110 and a user equipment (UE) 120. The base station 110 includes a processor 112, a memory 114 and an RF (radio frequency) unit 116. The processor 112 can be configured to implement the procedures and/or methods proposed in the present invention. The memory 114 is connected to the processor 112 and stores various kinds of information related to operations of the processor 112. The RF unit 116 is connected to the processor 112 and transmits and/or receives radio or wireless signals. The user equipment 120 includes a processor 122, a memory 124 and an RF unit 126. The processor 122 can be configured to implement the procedures and/or methods proposed in the present invention. The memory 124 is connected to the processor 122 and stores various kinds of information related to operations of the processor 122. The RF unit 126 is connected to the processor 122 and transmits and/or receives radio or wireless signals. The base station 110 and/or the user equipment 120 can have a single antenna or multiple antennas.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, a specific operation explained as performed by a base station can be performed by an upper node of the base station in some cases. In particular, in a network constructed with a plurality of network nodes including a base station, it is apparent that various operations performed for communication with a user equipment can be performed by a base station or other network nodes except the base station. In this case, 'base station' can be replaced by such a terminology as a fixed station, a Node B, an eNodeB (eNB), an access point and the like.

The embodiments of the present invention may be implemented using various means. For instance, the embodiments of the present invention may be implemented using hardware, firmware, software and/or any combinations thereof.

In case of the implementation by hardware, one embodiment of the present invention may be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then driven by a processor.

The memory unit may be provided within or outside the processor to exchange data with the processor through the various means known to the public.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The method of allocating a reference signal resource in a wireless communication system and apparatus therefor can be applied to various wireless communication systems.

The invention claimed is:

1. A method of transmitting a reference signal by a transmitting device in a wireless communication system, the method comprising:
   receiving a configuration of a resource pool consisting of uplink resources; and
   mapping reference signals and data to a specific uplink resource based on the resource pool configuration and N antennas of the transmitting device (where N is a natural number),
   wherein the reference signals are mapped to resource elements positioned at one or more specific locations in the specific uplink resource,
   wherein the data are mapped to consecutive resource elements, and wherein the number of consecutive resource elements equals the number of the antennas in a time domain, and
   wherein the data are configured to be orthogonal to each other on uplink resources except the one or more specific locations by applying a space-time block code (STBC) in the time domain.

2. The method of claim 1, wherein the reference signals and data are mapped to at least one resource set, each of which is composed of N+1 resource elements, and wherein a distance between the reference signals mapped to the at least one resource set corresponds to the N+1 resource elements.

3. The method of claim 2, wherein N is 4, and wherein the reference signals are configured to be mapped to the at least one resource set and resource elements not included in the at least one resource set in the specific uplink resource.

4. The method of claim 2, wherein the at least one resource set includes a first resource set and a second resource set, and wherein the first and second resource sets are configured to use different antenna ports.

5. The method of claim 1, wherein only when a movement speed of the transmitting device is equal to or smaller than a predetermined value, the data are mapped such that the data are orthogonal to each other.

6. The method of claim 1, wherein the reference signals are mapped in an N-comb manner in the time domain.

7. The method of claim 1, wherein the uplink resource corresponds to an uplink subframe.

8. A transmitting device for transmitting a reference signal in a wireless communication system, the transmitting device comprising:
   a transmitter and receiver; and
   a processor,
   wherein the processor is configured to:
   receive a configuration of a resource pool consisting of uplink resources; and
   map reference signals and data to a specific uplink resource based on the resource pool configuration and N antennas of the transmitting device (where N is a natural number), wherein the reference signals are mapped to resource elements positioned at one or more specific locations in the specific uplink resource, wherein the data are mapped to consecutive resource elements, and where the number of consecutive resource elements is equal to the number of the antennas in a time domain, and wherein the data are configured to be orthogonal to each other on uplink resources except the one or more specific locations by applying a space-time block code (STBC) in the time domain.

9. The transmitting device according to claim 8, wherein the transmitting device is capable of communicating with at least one of another receiving device, a receiving device related to an autonomous driving vehicle, a base station or a network.

* * * * *